F. BEEMER.
CHANGE SPEED MECHANISM.
APPLICATION FILED JULY 31, 1914.
1,145,344.
Patented July 6, 1915.
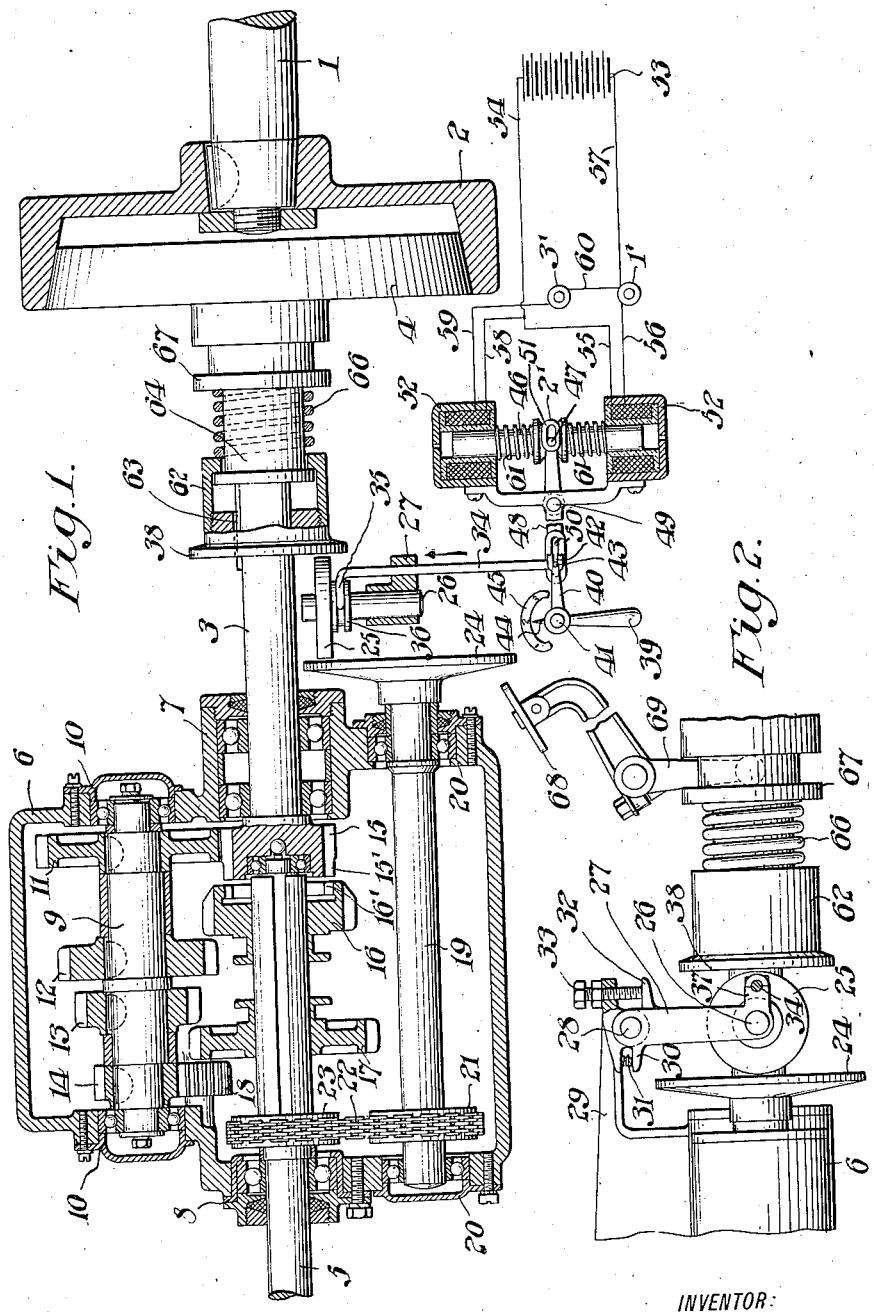
WITNESSES:
R. Schleicher.
Jos. G. Denny Jr.
INVENTOR:
Frank Beemer,
BY
Charles N. Butler
ATTORNEY.

UNITED STATES PATENT OFFICE.

FRANK BEEMER, OF PHILADELPHIA, PENNSYLVANIA, ASSIGNOR OF ONE-HALF TO BUDD G. NICE, OF OGONTZ, PENNSYLVANIA.

CHANGE-SPEED MECHANISM.

1,145,344.  Specification of Letters Patent.  Patented July 6, 1915.

Application filed July 31, 1914. Serial No. 854,258.

*To all whom it may concern:*

Be it known that I, FRANK BEEMER, a citizen of the United States, residing in the city of Philadelphia, county of Philadelphia, and State of Pennsylvania, have invented certain Improvements in Change-Speed Mechanism, of which the following is a specification.

My invention is designed, primarily, to provide improved means for coördinating the movements of change speed gears, prior to effecting their engagements, for the purpose of avoiding clashing, wear, shock, and breakage, as well as effecting engagement without necessity of objectionable play or looseness of fit between the gears.

The improvements are especially applicable to use in motor vehicles, but it will be understood that they are adapted for use with change speed gears in general.

In the accompanying drawings, Figure 1 is a longitudinal part sectional view of mechanism embodying the invention, and Fig. 2 is a part sectional view of part of the construction of Fig. 1.

The mechanism, as illustrated in the drawings, comprises the usual revoluble engine shaft 1 having fixed thereon the clutch member 2, the alined journaled shaft 3 having splined thereon the clutch member 4 adapted for frictionally engaging the clutch member 2, and the alined shaft 5 having its end journaled in the end of the shaft 3 and adapted to be revolved by the shaft 3 at different relative speeds in the following manner. The gear case 6, having the journal boxes 7 and 8 in which the respective shafts 3 and 5 are journaled, contains the counter shaft 9 journaled in the boxes 10 of the case and having fixed thereon the gear wheels 11, 12, 13 and 14. The gear 11 meshes with the gear 15 fixed on the shaft 3, which transmits reduced speed to the shaft 9, in the type of the mechanism illustrated. A gear wheel 16 is splined on the shaft 5 so as to be movable into mesh with the gear 12 and with the gear 15 or to an idle intermediate position, the gear 16 having the internal teeth 16' adapted for clutching or meshing with the exterior teeth 15' of the gear 15 to produce the highest forward speed and meshing exteriorly with the gear 12 to produce the next lower forward speed. A gear wheel 17 is splined on the shaft 5 so as to be movable into mesh with the gear 13 to produce the lowest forward speed and into engagement with the idler gear 18 meshing with the gear 14 to reverse, the gear 17 also being adapted to run in an idle intermediate position.

The foregoing features are of usual construction and illustrate one of various types of change speed mechanisms to which my improvements are applicable.

In accordance with my invention, in a usual form thereof, a counter shaft 19 is journaled in the boxes 20 of the case 6 and has fixed thereon the sprocket wheel 21 which is connected by a sprocket chain 22 with a sprocket wheel 23 fixed on the shaft 5. A friction disk 24 is fixed on the shaft 19 and is adapted to be engaged by a friction disk 25 mounted on a shaft or arbor 26 disposed transversely to the shaft 19. The arbor 26 is carried by an arm 27 adapted to rock on the fulcrum 28 which is carried by a bracket 29 on the gear case. The arm 27 is provided with a projection 30 against which presses a spring 31 to hold the disk 25 normally out of engagement with the disk 24. This arm is also provided with the projection 32 adapted to engage a set screw 33 carried by the bracket 29 to limit the movement of the disk 25 away from the disk 24. A rod 34, having a yoke 35 which engages a collar 36 on the disk 25, is movable longitudinally through the bearing 37 on the arm 27 to move the disk 25 along the arbor 26, for the purpose of varying its position with reference to the axis of the disk 24 and that of a disk 38, which is splined on the shaft 3 and adapted to be moved into engagement with the disk 25. The rod 34 is movable by means of a crank lever, comprising the handle 39 and the arm 40, fulcrumed by a bearing 41, the arm 40 containing a slot 42 in which is disposed a pin 43 fixed on the rod, a pointer 44 fixed to the lever being movable over a dial 45 and indicating the positions for the several speeds.

The double solenoid armature 46 carries a pin 47, and a lever 48, fulcrumed on the bearing 49, has the slot 50 in which the pin 43 is disposed and a slot 51 in which the pin 47 is disposed. The solenoid coils 52, by which the armature 46 is reciprocated, are in circuits, one of which comprises the source of electric energy 53 together with the conductors 54, 55, 56, and 57, (this circuit being normally open and closed by the push button switch 1',) and the other circuit comprising the conductors 54, 58, 59, 60, and 57, this circuit being normally open and closed by the push button 3'.

When both circuits are open, the armature 46 is held in the central position 2' by the coiled springs 61, in which position the pointer 44 stands at the intermediate position ² on the dial 45, which corresponds to the position of the disk 25 with relation to the disks 24 and 38 for the second speed. When the button 1' is pressed in to close its circuit, the armature 46 is subjected to electro-magnetic action, whereby it is actuated and acts through the lever 48 upon the rod 34 to move the disk 25 from the position for transmitting the second speed to the position for transmitting the first or lowest speed, that is to say, from the axis of the disk 24 toward the axis of the disk 38. When the button 3' is pressed in to close its circuit, the armature 46 is moved by the thus excited coil of this circuit and rocks the lever 48, which acts through the rod 34 on the disk 25 to move it from the axis of the disk 38 toward that of the disk 24, to transmit the third or highest speed.

The disk 38 is carried by a barrel 62 connected with the shaft 3 by a key 63. A sleeve 64, fixed to the part 4 and connected to the shaft 3 through the key 63, has thereon a coiled spring 66 which is disposed between the collar 67 on the sleeve and the barrel 62. When the member 4 is withdrawn from its engagement with the member 2 by pressure applied through the pedal 68 to the arm 69 and the collar 67, the spring 66, by its action through the barrel 62, moves the disk 38 into engagement with the disk 25 and the latter into engagement with the disk 24, the spring contracting to permit any further movement of the part 4 that may be desired.

It will be understood from the foregoing description that the operation of unclutching the member 4 effects an engagement between the shafts 3 and 5 through the parts 38, 25, 24, 19, 21, 22, and 23, which, in the normal position of the part 25, coördinates the revolutions of the shafts 3 and 5 to the second or intermediate speed ratio. The peripheries of the wheels 12 and 16 now revolve at the same speed, and permit the latter to be moved into engagement with the former without clashing or shock. When it is desired to shift to the first or lowest speed, the handle 39 is operated to move the pointer 44 opposite the numeral ¹ on the dial 45, or the button 1' is pressed in to close its circuit. This operation shifts the disk 25 toward the shaft 3, whereby, upon unclutching the member 4, the shafts 3 and 5 are connected through the parts 38, 25, 24, 19, 21, 22 and 23 to produce the desired speed ratio, permitting the gear 17 to be shifted into engagement with the gear 13 without clashing since their peripheries are traveling at the same speed. When it is desired to obtain the third or highest speed, the handle 39 is thrown to move its pointer 44 opposite the numeral ³ on the dial 45 or the button 3' is pressed in to close its circuit. Thereby the disk 25 is moved from the intermediate position, which it normally occupies, toward the shaft 19 and, by disengaging the clutch member 4, the disks 38, 25 and 24 are engaged. Thus the shafts 3 and 5 are connected to revolve at the speed ratio desired, permitting the gear 16 to be moved into clutching engagement with the gear 15 without clashing. When it is desired to throw in the reverse, the engagement of the disks 24, 38, and 25 (in the normal position of the latter or in the position for low speed) effects a braking action on both shafts 3 and 5, tending to bring them to rest, whereupon the gear 17 can be shifted into engagement with the gear 18.

Having described my invention, I claim:

1. The combination with a pair of shafts and mechanism for connecting said shafts to operate at different speed ratios, of a frictional device movable along and revolved by one of said shafts, a second frictional device having an axis transverse to and adapted to be engaged by said frictional device first named, a third frictional device having an axis transverse to and adapted to be engaged by said second frictional device, and means for connecting said third frictional device to the other of said shafts, whereby said shafts are adapted to be revolved together at a predetermined speed ratio.

2. The combination with a pair of journaled shafts and mechanism comprising change speed gears for connecting said shafts to operate at different speed ratios, of a frictional device movable along and revolved by one of said shafts, a second frictional device movable radially with reference to and adapted to be engaged by said frictional device first named, a third friction device adapted to be engaged by said second frictional device which is movable radially thereto, means for connecting said third frictional device with the other of said shafts, and means for shifting said second frictional device to effect coördination of revolution of said shafts permitting said gears to be engaged without shock.

3. The combination of a pair of journaled shafts and mechanism comprising change speed gears for connecting said shafts to revolve at different speed ratios, a counter shaft, means for connecting said counter shaft in revoluble relation to one of said shafts, a frictional device adapted to be revolved by said counter shaft, a second frictional device adapted to be revolved by said frictional device first named, a third frictional device adapted to revolve the other of said shafts and to be revolved by said second frictional device, and means for shifting said second frictional device to change the speed transmitted from one to the other of said shafts.

4. The combination of a pair of journaled shafts and change speed mechanism adapted for connecting said shafts to revolve at different speed ratios, a clutch member and friction member movable longitudinally on and revoluble by one of said shafts, a spring interposed between said clutch and friction members whereby the former is adapted to move the latter, a friction member having an axis transverse to and adapted to revolve said friction member first named, a friction member having an axis transverse to and adapted to revolve said friction member second named, means for shifting said friction member second named to change the speed ratio transmitted therethrough between the first and third named friction members, and means whereby the third named friction member is revolved by the other of said shafts.

5. The combination of a pair of journaled shafts and change speed mechanism adapted for connecting said shafts to revolve at different speed ratios, of means for coördinating the revolutions of said shafts to permit said mechanism to be shifted into different relations without substantial shock, said means comprising a friction disk and apparatus for shifting said disk whereby the speed ratios between said shafts are altered.

6. The combination of a pair of journaled shafts and change speed mechanism for connecting said shafts to revolve at different speed ratios, of means for coördinating the revolutions of said shafts to permit said mechanism to be changed without substantial shock, said means comprising a friction disk and electrically operated means for shifting said disk axially to alter the speed ratio between said shafts.

7. The combination of a pair of journaled shafts and change speed mechanism for connecting said shafts to revolve at different speed ratios, of means for coördinating the revolutions of said shafts to permit said mechanism to be changed without shock, said means comprising a frictional member movable along and adapted to revolve one of said shafts, a second frictional member adapted to revolve said frictional member first named, means for moving said second frictional member axially, and means whereby said second frictional member is revoluble by the other of said shafts.

8. The combination of a pair of journaled shafts and change speed mechanism for connecting said shafts to revolve at different speed ratios, of means for coördinating the revolutions of said shafts to accord with the ratio to be produced by changes of said speed mechanism, said means comprising a friction disk movable longitudinally on and revoluble by one of said shafts, an arm having a limited movement of oscillation, a second friction disk carried by said arm and adapted to be engaged by said disk first named, a third friction disk with which said second disk is adapted to be engaged by said first disk, and means for varying the position of said second disk relative to the axes of said first and third disks.

9. The combination of journaled shafts and change speed mechanism adapted for connecting said shafts to revolve at different speed ratios, of means for coördinating the revolutions of said shafts, said means comprising a friction device revolved by and movable longitudinally on one of said shafts, a second friction device journaled revolubly and movable longitudinally on an axis transverse to the axis of said device first named, a third friction device revoluble on an axis transverse to the axis of said second device, means for moving said device first named into engagement with said second device and causing said second device to engage said third device, means for withdrawing said second device from said third device on the withdrawal of said first device from said second device, and means for moving said second device axially.

In testimony whereof I have hereunto set my name this 30 day of July, 1914, in the presence of the subscribing witnesses.

FRANK BEEMER.

Witnesses:
 CHARLES N. BUTLER,
 JOS. G. DENNY, Jr.